US007584170B2

(12) United States Patent
Coulson et al.

(10) Patent No.: US 7,584,170 B2
(45) Date of Patent: Sep. 1, 2009

(54) CONVERTING NUMERIC VALUES TO STRINGS FOR OPTIMIZED DATABASE STORAGE

(75) Inventors: Michael J. Coulson, Kirkland, WA (US); David Wortendyke, Seattle, WA (US); Kevin Grealish, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 11/079,164

(22) Filed: Mar. 14, 2005

(65) Prior Publication Data

US 2005/0165768 A1 Jul. 28, 2005

Related U.S. Application Data

(63) Continuation of application No. 09/794,867, filed on Feb. 27, 2001, now Pat. No. 6,907,435.

(51) Int. Cl.
*G06F 7/00* (2006.01)
(52) U.S. Cl. ......................................................... 707/2
(58) Field of Classification Search .................. 707/1, 707/2, 101, 102
See application file for complete search history.

(56) References Cited

U.S. PATENT DOCUMENTS 5,508,948 A * 4/1996 Hatta ........................... 708/204
6,374,252 B1 * 4/2002 Althoff et al. ................ 707/102

OTHER PUBLICATIONS

Gordon Linoff et al., Compression of Indexes with full positional information in very large text databases, ACM, 1993, Annual ACM Conference on Reasearch and development in information retrieval, Proceedings of 16th annual international ACM SIGIR coference, pp. 88-95.*
Storing and manipulating multimedia database objects by PostScript and relational databases; K. Tanaka; *Interoperable Information Systems, Proceedings from the Second International Symposium*, 1988, pp. 203-210.

(Continued)

*Primary Examiner*—Charles Rones
*Assistant Examiner*—Fazlul Quader
(74) *Attorney, Agent, or Firm*—Merchant & Gould

(57) ABSTRACT

A conversion method for converting numeric multi-dimensional database members to textual representations may be provided. The conversion may allow textual representations for the numeric dimension members to be sorted and converted back into numeric representations with accuracy. All numeric and date data may be transformed during conversion, such that the textual representation of the numeric and date data is properly sorted as a text string, in the same order as it would be sorted as a number. Accurate reverse-conversion (i.e., from textual representation to numeric representation) may also be provided. The reverse-conversion may include converting into text, information that may be necessary to support a precision required by the relevant convention of the numeric representation and a convention for determining the data type of the textual representations of values. The textual representation may be configured to sort by value independent of the numeric data-types.

18 Claims, 7 Drawing Sheets

OTHER PUBLICATIONS

Compression of indexes with full positional information in very large text databases; G. Linoff and C. Stanfill; *SIGIR Forum*, (spec. issue) 1993, pp. 88-95.

The Lempel-Ziv-Welch (LZW) data compression algorithm for packet radio; W. Kinsner and R.H. Greenfield; *IEEE Western Canada Conference on Computer, Power and Communications Systems in a Rural Environment*; 1991; 225-9.

Classifications of graphics metafile encodings; J. Schoenhut; *Computers & Graphics* vol. 10 No. 2; 1986; pp. 107-111.

* cited by examiner

| SIGN | SIGNIFICAND |
|---|---|
| 300 | 301 |

INTEGER

*Fig. 3a*

| SIGN | EXPONENT | SIGNIFICAND |
|---|---|---|
| 302 | 304 | 306 |

FLOATING POINT

*Fig. 3b*

| SIGN | EXPONENT | SIGNIFICAND |
|---|---|---|
| 308 | 310 | 312 |

DECIMAL

*Fig. 3c*

| SIGN | SCALE | SIGNIFICAND |
|---|---|---|
| 318 | 314 | 316 |

DECIMAL

*Fig. 3d*

CONVERTING NUMERIC VALUES TO STRINGS FOR OPTIMIZED DATABASE STORAGE

CROSS-REFERENCE TO RELATED APPLICATIONS

This patent application is a continuation of U.S. patent application Ser. No. 09/794,867, entitled "Converting Numeric Values To Strings For Optimized Database Storage," filed on Feb. 27, 2001 and assigned to the same assignee as this application. The aforementioned patent application is expressly incorporated herein, in its entirety, by reference.

FIELD OF THE INVENTION

The present invention generally relates to processing data in a database. More particularly, the present invention relates to converting a numeric dimension member to a text value while preserving the sort order and precision of the dimension member.

BACKGROUND OF THE INVENTION

The Internet (and technology generally) requires efficient systems for storing and accessing data and multi-dimensional databases are commonly used for these functions. Typically, multi-dimensional database systems store dimension member data as text strings only. In such multi-dimensional database systems, all dimension member data, including dimension member data having numeric values, must be represented as text. Additionally, many Internet standards, such as XML, are text-based. Accordingly, numeric and date data must be converted to text before storing the dimension member data in such a database system or representing the data in such text-based standards.

Dimension members are the names of points on the axes of a multi-dimensional database. For example, a multi-dimensional database "cube" might store sales values natively in cells and have a dimension "geographic region" with dimension members of "USA", "Australia", "WA", "Seattle" and another dimension "sales commission" with members 8%, 10%, 12.5%, 14%. The "sales commission" members will need to be stored as text strings in conventional database systems.

Various conversion methods exist for converting numeric and date data to text. For example, a binary number could be divided into four-bit sections and then each section could be converted to hexadecimal. In this example, the binary number 0000 0001 0010 1110 1111 would become the hexadecimal representation (and text string) 012EF. Unfortunately, this and other conversion methods present various drawbacks. Conventional conversion methods produce text strings that are not properly sortable in their text representations. That is, a sort of the text representation of a group of numbers would not produce the same order as a sort on the same numbers in their numeric representation. Conventional conversion methods also fail to provide accurate results when the text representation of a number is converted back (reverse-converted) into a native (i.e., non-text) representation. This problem occurs, for example, when reverse-converting decimal representations of floating point numbers.

Therefore, there is a need in the art for a conversion method that permits textual representations of numbers to be properly sorted in the textual representation and converted back into numeric representations with accuracy. The method should also provide a means for differentiating between data types (e.g., numeric, date, string, Boolean, and null) of values represented as text.

SUMMARY OF THE INVENTION

The present invention provides a conversion method for converting numeric database dimension members to textual representations. The conversion is specifically designed to enable the textual representations of the numeric dimension members to be properly sorted and converted back into numeric representations with accuracy. All numeric and date data is transformed during conversion, such that the textual representation of the numeric and date data is properly sorted as a text string, in the same order as it would be sorted as a number. The present invention also provides a means for accurate reverse-conversion (i.e., from textual representation to numeric representation) by first converting into text the information necessary to support the precision required by the relevant convention of the numeric representation. Finally, the present invention provides a convention for determining the data type of the textual representations of values of various data types. The textual representation of mixed types is configured so that the sort order of different data types and the text string for numeric types will sort by value, independent of the numeric data-types.

In one aspect of the invention, a method is provided for converting a number in a binary representation to a textual representation while preserving numeric precision and sort order. The method determines the type of the number and in response to a determination that the number is an integer type, inverts the number's integer sign bit, and converts the number from the binary representation to a hexadecimal representation. In response to a determination that the number is a floating point type, the method determines whether the number is positive. In response to a determination that the number is positive, the method inverts the number's integer sign bit, and converts the floating point type number from the binary representation to a hexadecimal representation. In response to a determination that the number is not positive, the method inverts each of the number's bits, and converts the number from a binary representation to a hexadecimal representation. In response to a determination that the number is a decimal type, the method determines whether the decimal type number is positive. In response to a determination that the decimal type number is positive, the method inverts the number's sign bit and converts the decimal type number from the binary representation to a decimal representation having a plurality of digits. The method then inverts each of the plurality of digits. In response to a determination that the decimal type number is not positive, the method invert the sign bit and converts the decimal type number from the binary representation to a decimal representation having a plurality of digits.

In another aspect of the invention, a method is provided for populating a database file with textual representations of numeric data. The method receives a dimension member and determines whether the dimension member is a non-text dimension member. If the dimension member is a non-text dimension member, then the method converts the dimension member to a textual representation and stores the converted dimension member in the database file. If the dimension member is a textual dimension member, then the method stores the dimension member in the database file without converting it.

In yet another aspect of the invention, a method is provided for classifying a textual representation of a dimension member data within a database file. The method assigns a code to the textual representation, whereby the code identifies the class type of the textual representation. The method then appends the code to the textual representation. The method also assigns a sub-code to the textual representation, whereby the sub-code identifies the sub-class type of the textual representation. The method then appends the sub-code to the textual representation.

The various aspects of the present invention may be more clearly understood and appreciated from a review of the following detailed description of the disclosed embodiments and by reference to the drawings and claims.

BRIEF DESCRIPTION OF THE DRAWINGS

FIG. 3a depicts a block diagram of a binary representation of an integer dimension member.

FIG. 3b depicts a block diagram of a binary representation of a floating-point number.

FIG. 3c depicts a block diagram of a binary representation of a decimal number.

FIG. 3d depicts a block diagram of an alternative binary representation for a decimal number.

DETAILED DESCRIPTION OF EXEMPLARY EMBODIMENTS

The present invention provides a conversion method for converting numeric multi-dimensional database dimension members to textual representations. The conversion is specifically designed to enable the textual representations of the numeric dimension members to be properly sorted and converted back into numeric representations with accuracy. All numeric and date data is transformed during conversion, such that the textual representation of the numeric and date data is properly sorted as a text string in the same order as it would be sorted as a number. The present invention also provides a means for accurate reverse-conversion (i.e., from textual representation to numeric representation) by first converting into text the information necessary to support the precision required by the relevant convention of the numeric representation. Finally, the present invention provides a convention for determining the data type of the textual representations of dimension members of various data types. The textual representation of mixed types is configured so that the sort order of different data types and the text string for numeric types will sort by value independent of the numeric data-types.

Figure 1:
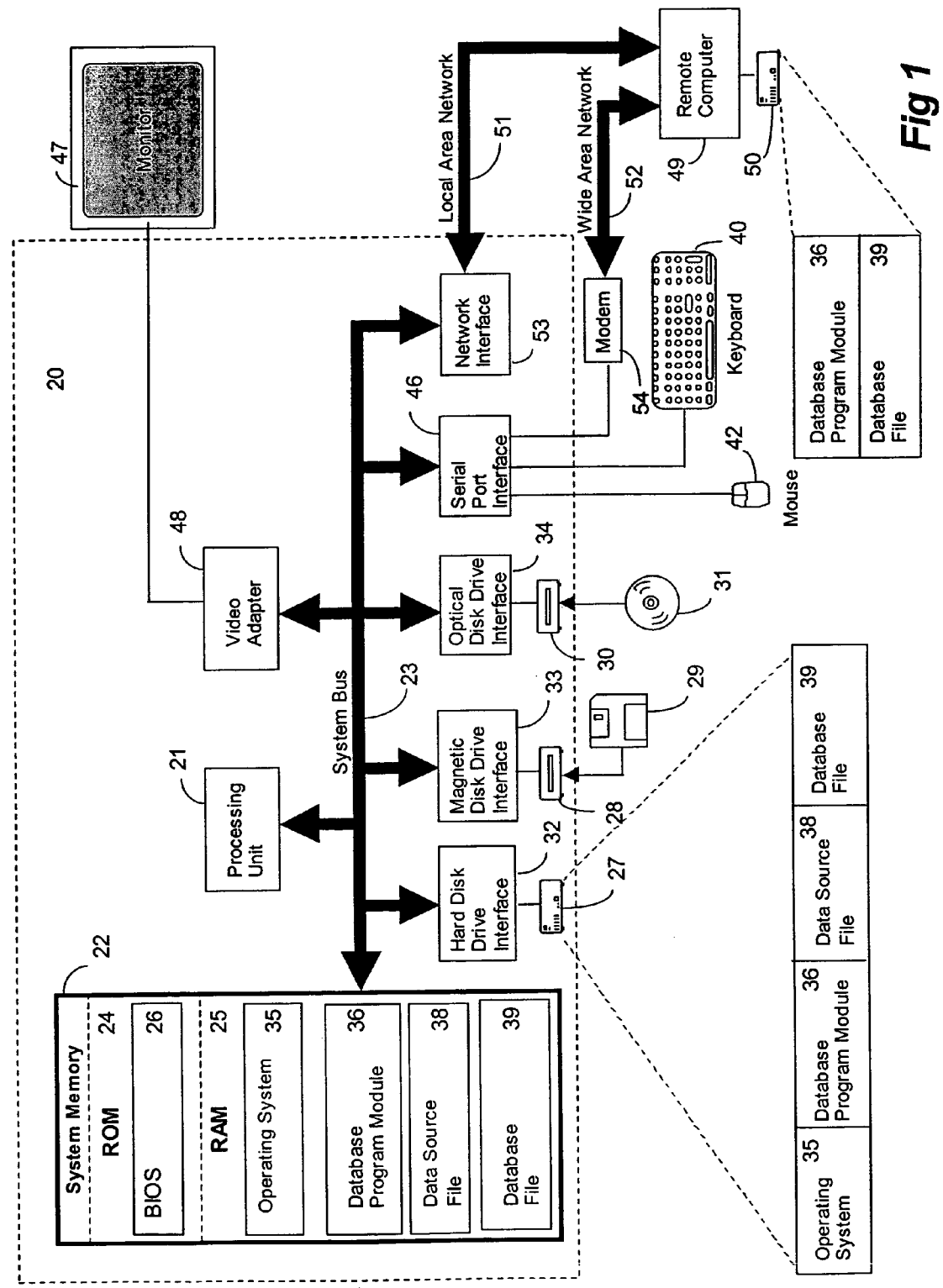
FIG. 1 is a block diagram illustrating an exemplary operating environment for implementing of the present invention.

Exemplary embodiments of the present invention will hereinafter be described with reference to the drawing, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 may be stored in the RAM 25 and/or hard drive 27 of the personal computer 20.

A number of program modules may be stored on hard disk 27, magnetic disk 29, optical disk 31, ROM 24, or RAM 25, including an operating system 35, a database program module 36, a data source file 38, and a database file 39. Program modules include routines, sub-routines, programs, objects, components, data structures, etc., which perform particular tasks or implement particular abstract data types. Aspects of the present invention may be implemented in the form of a database program module 36 that can process data and dimension members contained in a data source file 38 and can store data and dimension members in a database file 39. The database program module 36 generally comprises computer-executable instructions for creating or modifying an electronic database.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
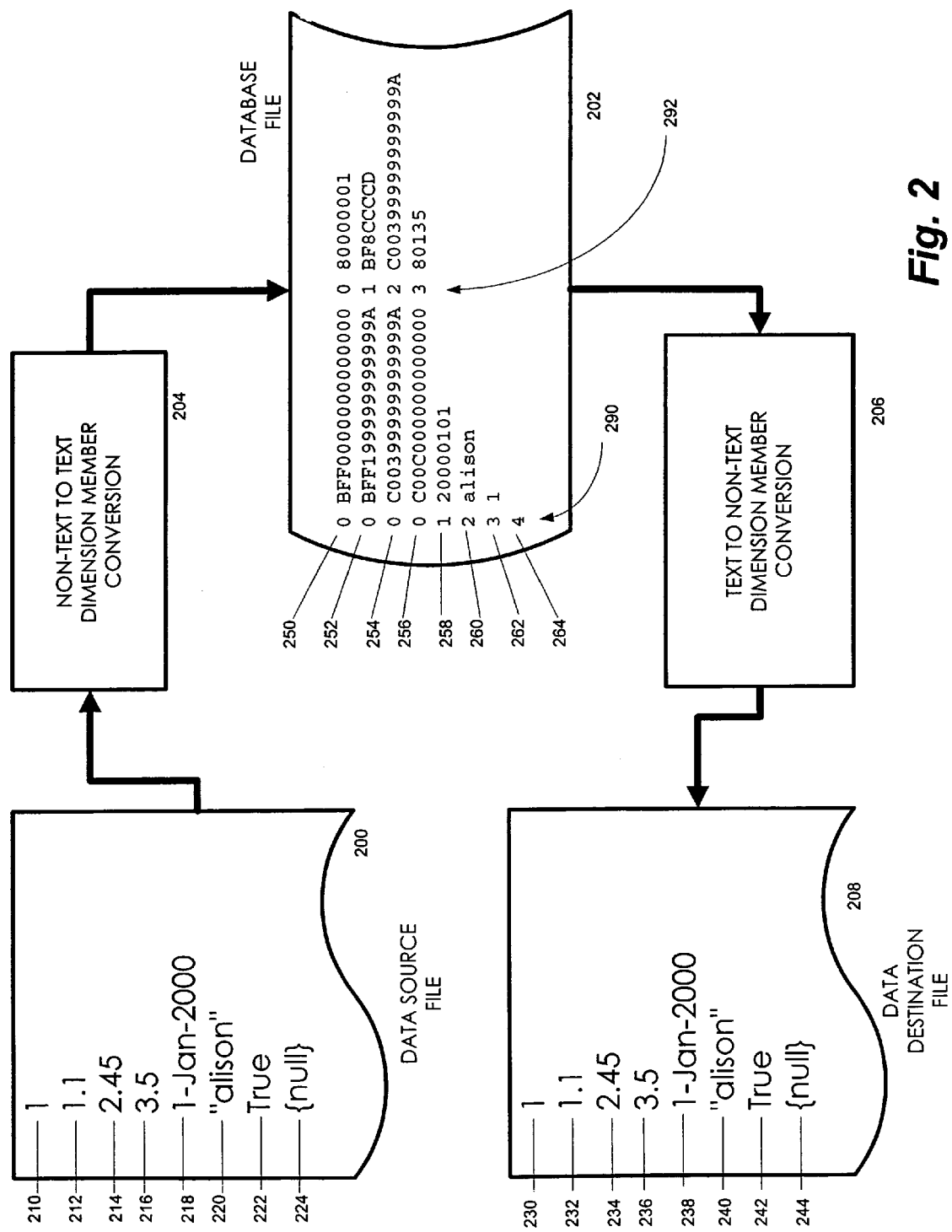
FIG. 2 depicts an exemplary embodiment of the present invention, utilized to create a text-only database file.

FIG. 2 depicts an exemplary embodiment of the present invention, utilized to create a text-only database file 202. Dimension member data 210-224 contained in a data source file 200 is transferred and stored in database file 202. However, because the dimension member data 210-224 is represented in its native, numeric format, and because the database file 202 stores dimension member data in text format only, the dimension member data must first be converted to text. The non-text to text dimension member conversion 204 converts the dimension member data 210-224 to a text-based representation for storage in the database file 202. Although the dimension member data 210-224 are represented in FIG. 2 in various data formats (e.g., text, decimal), typically, data would be stored in the data source file 200 in binary format. More details regarding the non-text to text conversion are provided below in connection with FIG. 3.

In short, the non-text to text conversion 204 must convert the dimension member data 210-224 to a textual representation such that the textual representation can be converted back to the native, numeric format of the dimension member data 210-224 while maintaining the original numeric precision of the dimension member data. Moreover, the textual representation of the dimension member data 250-264 should be able to be sorted in its textual representation. That is, a sort on the textual dimension member data 250-264 should generate the same sort order as if the native, dimension member data 210-224 had been subjected to the same sort. Finally, the textual dimension members 250-264 should be identifiable by data type. That is, when dimension member data of different data types (e.g., text strings and floating-point numbers) are included in the database file 202, the dimension member data should be discernable by data type. This is advantageous, because it allows dimension member data to be sorted within applicable data types.

FIG. 2 also depicts a text to non-text dimension member reverse-conversion 206 for reverse-converting textual dimension member data 250-262 to non-text (native) dimension member data 230-244. The reverse-converted, non-text dimension member data 230-244 is said to be stored in a data destination document 208. Of course, the reverse-converted data could be stored in the data source file 200, but a distinction is made between these documents for simplicity of description.

As can be seen in FIG. 2, an integer value 210 of "1" is converted by the non-text to text conversion 204 into a text representation 250. Similarly, the textual representation 250 is converted by the reverse-conversion 206 to integer representation 230. The same conversion and reverse-conversion can be performed on the remaining dimension member data 212-224. Namely, single-precision (32 bit) floating-point numbers 212, double-precision (64 bit) floating-point numbers 214, decimal numbers 216, dates 218, text strings 220, Boolean values 222, and null values 224 can be converted by an exemplary embodiment of the present invention to text format and reverse-converted to the applicable native format.

The textual dimension member data 250-262 depicted in FIG. 2 also include codes 290 specifying the class type of the dimension member (e.g., numeric, date, string) and sub-codes 292 specifying the sub-class of the dimension member (e.g., integer, floating-point, decimal). The non-text to text conversion 204 assigns a code 290 to each dimension member and a sub-code 292 to each numeric dimension member during the conversion. While the codes 290 enable the differentiation of types, such as numeric types and string types, the sub-codes 292 enable the differentiation of sub-types, such as floating-points and decimals. By classifying the dimension member data, sorts can be more narrowly tailored. The order generated when sorting textual dimension member data can be adjusted by selecting the codes used for the different types. For example, using code "0" for numeric and code "2" for strings will cause numeric values to be sorted before string values. The sub-codes allow numeric values to be sorted independently of their type. When converting a numeric value for a dimension with mixed data types the value is first converted to a double precision floating point number. That double precision floating point number is converted to text to form the first part of the string. Then a code for the sub-type is appended. If the precision of the value is more than can be stored in a double precision floating point number, then the original value is converted to text to form the last part of the string. In the examples in the database file 202, this last portion is shown for all the numeric types 250-256, because this portion is only applicable to numeric values.

In addition, the code/sub-code classification of the textual representations of the dimension members facilitates the text to non-text conversion 206. The text to non-text conversion 206 (reverse conversion) can be performed by reversing the steps of the non-text to text conversion 204. By classifying the dimension member data, this reverse-conversion is facilitated, because the type of each dimension member data is known. Thus, the reverse-conversion knows to reverse-convert a dimension member with a numeric code 290 and a decimal sub-code 292 by reversing the process used by the non-text to text conversion 204 to create the textual representation of the decimal dimension member in the first instance.

Those skilled in the art will appreciate that the use of type and sub-type codes is only useful when there are mixed data types. If the data types of all relevant values are the same, then only the values converted to text are required. For example, the integer value "1" 210 could simply be converted to the text representation "80000001."

FIGS. 3a-3d depict block diagrams of exemplary dimension member data types. The data types are represented in block form for simplicity, but are typically comprised of 32 bit or 64 bit binary numbers.

FIG. 3a depicts a block diagram of a binary representation of an integer dimension member. Typically, an integer has two components, a sign component 300 indicating the positive or negative status of the integer and a significant component 301. Negative value integers are differentiated from positive value integers by the well-known twos complement method.

FIG. 3b depicts a block diagram of a binary representation of a floating-point dimension member. Generally, a floating-point number has three components, each represented by one or more bits in a binary representation of the floating-point number. A floating-point number typically has a sign component 302 indicating the positive or negative status of the floating-point number. A floating-point number also can have an exponent component 304 and a significant component 306. If the binary representation of the floating-point number is stored in the sign-exponent-significant order depicted in FIG. 3b, then it will properly sort with other binary representations of floating-point numbers, because the sign, the exponent, and the significant, are in a proper order with respect to the significance of these components on the value of the floating-point number. That is, if a floating-point number is compared to other floating-point numbers in a left-to-right fashion, the sign component will differentiate positive and negative numbers, the exponent component will differentiate between large and small numbers, and the significant component will differentiate between numbers having the same sign and exponent. However, when floating-point numbers are not represented in this order, an intermediate step may be necessary before sorting to place the floating-point numbers in a sortable format.

FIG. 3c depicts a block diagram of a binary representation of a decimal number. As with the floating-point number, the decimal number includes a sign component 308, an exponent component 310, and a significant component 312. As with the floating-point number depicted in FIG. 3b, sorting a decimal number like that depicted in FIG. 3c depends upon the order of the sign, exponent and significant components.

FIG. 3d depicts a block diagram of an alternative binary representation for a decimal number. In this representation a "scale" value is used to represent the location of the decimal within the significant. The scale component replaces the exponent component in the decimal number. Although not depicted in the decimal number of FIG. 3d, a decimal number may also have a precision field that determines the size of the significant.

Figure 4:
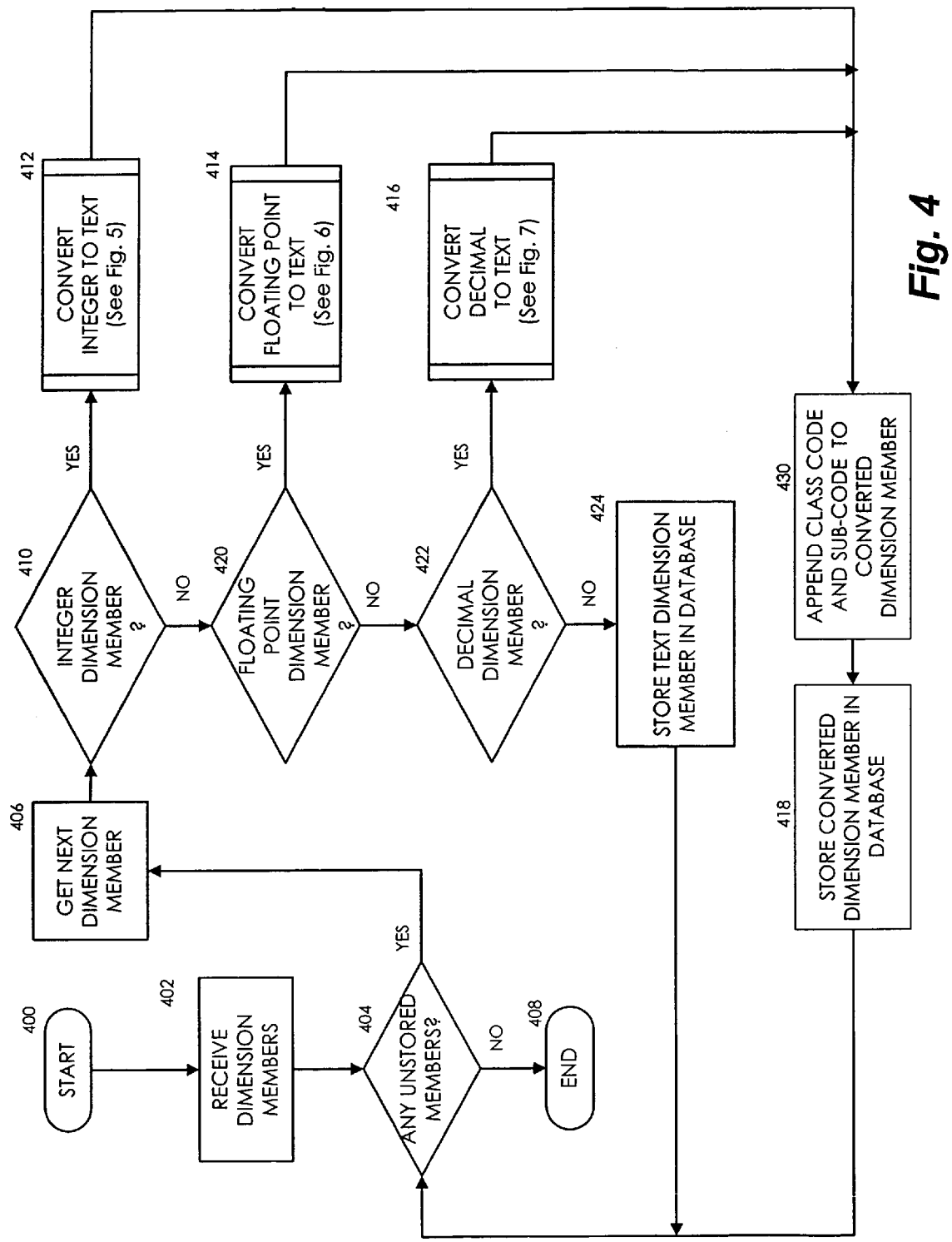
FIG. 4 is a flow chart depicting an exemplary method for converting the dimension member data types of FIGS. 3a-3d.

In an exemplary embodiment of the present invention, all of the data types depicted in FIGS. 3a-3d can be converted to text strings and reverse-converted to a native format without losing precision and without compromising sort order. FIG. 4 depicts a flow chart of an exemplary method for converting the numeric data types of FIGS. 3a-3d.

The method of FIG. 4 begins at step 400 and proceeds to step 402. At step 402, the dimension members are received. The dimension members can be received in various ways, including reading data from a text file, receiving input from a user, etc. Once the dimension members have been received, the method proceeds to decision block 404. At decision block 404 a determination is made as to whether the dimension members include unstored dimension members. If the dimension members do not include unstored dimension members, then the method branches to step 408 and ends.

Returning now to decision block 404, if a determination is made that the dimension members include unstored dimension members, then the method branches to step 406. At step 406, the "next" dimension member is obtained for conversion, if necessary, then the method proceeds to decision block 410. At decision block 410, a determination is made as to whether the unstored dimension member is an integer. If the unstored dimension member is not an integer, then the method branches to decision block 420. At decision block 420, a determination is made as to whether the unstored dimension member is a floating-point number. If the unstored dimension member is not a floating-point number then the method branches to decision block 422. At decision block 422 a determination is made as to whether the unstored dimension member is a decimal number. If the dimension member is not a decimal number, then the dimension member is probably a text dimension member and the method branches to step 424. At step 424, the text dimension member is stored in a database and the method proceeds back to decision block 404. If, on the other hand, the dimension member is a decimal number, then the method branches from decision block 422 to step 416.

Returning now to decision block 410, if a determination is made that the unstored dimension member is an integer number, then the method proceeds to step 412. At step 412, the unstored integer dimension member is converted to a textual representation. A more detailed description of this conversion is provided in connection with FIG. 5. The method then proceeds from step 412 to step 430 and a type code and sub-code are appended to the textual representation of the dimension member. The method then proceeds to step 418 and the converted dimension member (now in textual representation) is stored in the database. The method then proceeds to decision block 404. At decision block 404, a determination is made as to whether any more unstored dimension members exist. If a determination is made that no more unstored dimension members exist, then the method proceeds to step 408 as described above and ends. If, on the other hand, more unstored dimension members exist, then the method branches to step 406 and proceeds as described above.

Returning now to decision block 420, if a determination is made that the unstored dimension member is a floating-point number, the method branches to step 414. At step 414, the unstored floating-point dimension member is converted to a textual representation. A more detailed description of this conversion is provided in connection with FIG. 6. The method then proceeds from step 414 to step 430 and a type code and sub-code are appended to the textual representation of the dimension member. The method then proceeds to step 418 and the converted dimension member (now in textual representation) is stored in the database. The method then proceeds to decision block 404. At decision block 404, a determination is made as to whether any more unstored dimension members exist. If a determination is made that no more unstored dimension members exist, then the method proceeds to step 408 as described above and ends. If, on the other hand, more unstored dimension members exist, then the method branches to step 406 and proceeds as described above.

Returning now to decision block 422, if a determination is made that the unstored dimension member is a decimal number, then the method branches to step 416. At step 416, the unstored decimal dimension member is converted to a textual representation. A more detailed description of this conversion is provided in connection with FIG. 7. The method then proceeds from step 416 to step 430 and a type code and sub-code are appended to the textual representation of the dimension member. The method then proceeds to step 418 and the converted dimension member (now in textual representation) is stored in the database. The method then proceeds to decision block 404. At decision block 404, a determination is made as to whether any more unstored dimension members exist. If a determination is made that no more unstored dimension members exist, then the method proceeds to step 408 as described above and ends. If, on the other hand, more unstored dimension members exist, then the method branches to step 406 and proceeds as described above.

Figure 5:
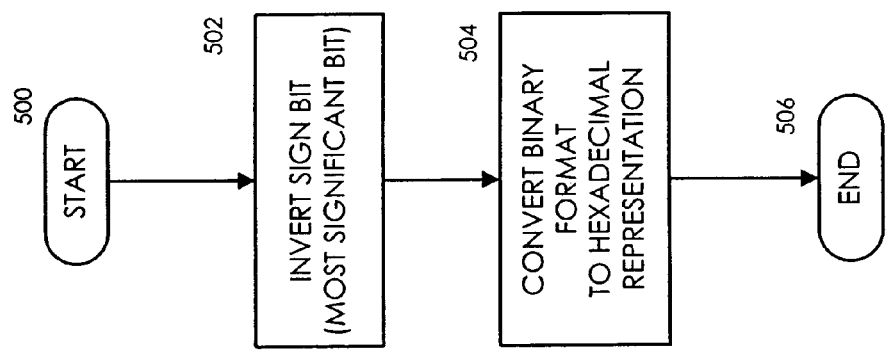
FIG. 5 is a flow chart depicting an exemplary method for converting a non-text integer dimension member to a textual representation.

FIG. 5 is a flow chart depicting an exemplary method for converting a non-text integer dimension member to a textual representation. The method starts at step 500 and proceeds to step 502. At step 502 the sign bit or the most significant bit of the integer is inverted. This involves changing a "1" to a "0" or a "0" to a "1". The method then proceeds to step 504 and the binary representation of the integer is converted to a hexadecimal representation. Although there are many ways to convert a binary number to a textual representation, converting the binary representation to hexadecimal permits the conversion of a four-bit portion of the binary representation to a single hexadecimal digit. For example, "0010" becomes "2" and "1101" becomes "D". The method then proceeds to step 506 and ends.

Figure 6:
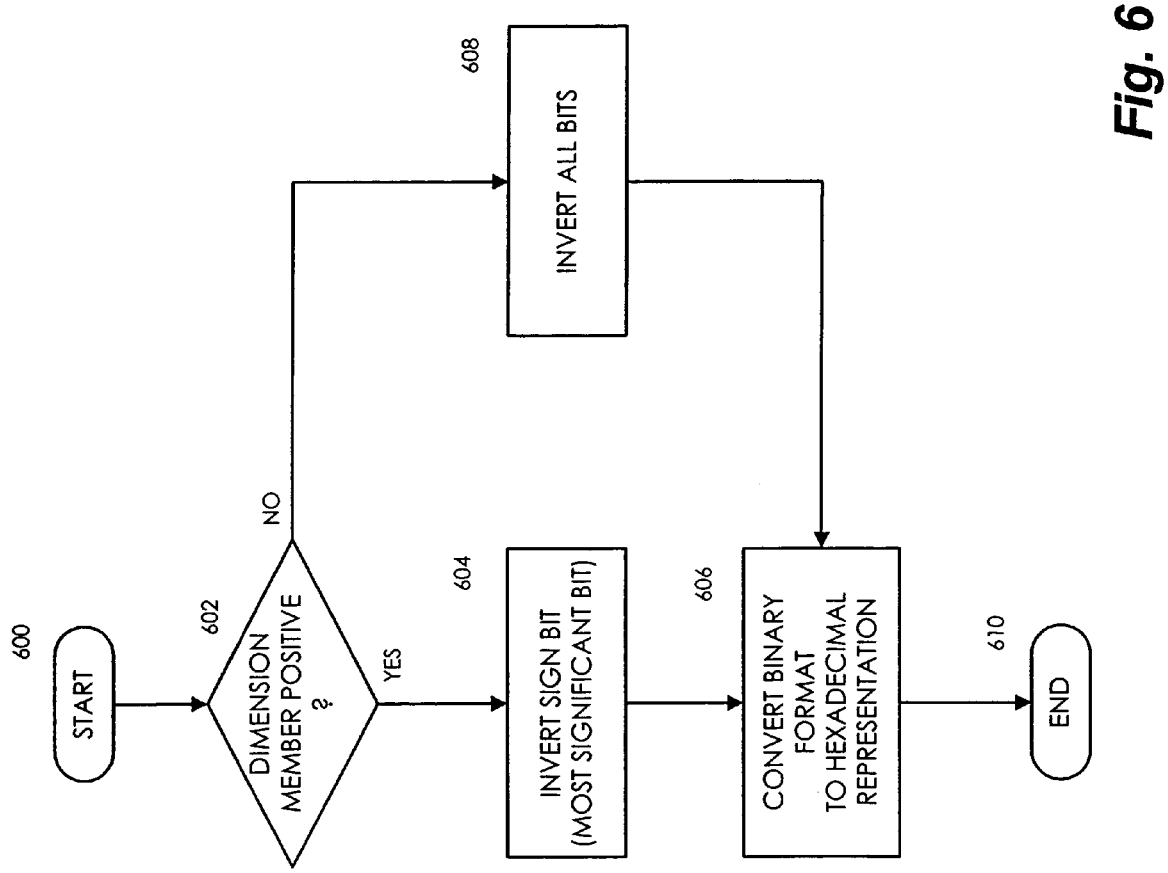
FIG. 6 is a flow chart depicting an exemplary method for converting a non-text floating-point dimension member to a textual representation.

FIG. 6 is a flow chart depicting an exemplary method for converting a non-text floating-point dimension member to a textual representation. The method begins at step 600 and proceeds to decision block 602. At decision block 602, a determination is made as to whether the floating-point dimension member is positive. If the floating-point number is not positive, then the method branches to step 608. At step 608, all of the bits of the floating-point number are inverted. The method then proceeds to step 606, wherein the binary representation of the floating-point number is converted to a hexadecimal representation. The method then proceeds to step 610 and ends.

Returning now to decision block 602, if a determination is made that the floating-point dimension member is positive, the method branches to step 604 and the most significant bit or the sign bit is inverted. The method then proceeds to step 606 and the binary representation of the floating-point number is converted to a hexadecimal representation. The method then proceeds to step 610 and ends.

Figure 7:
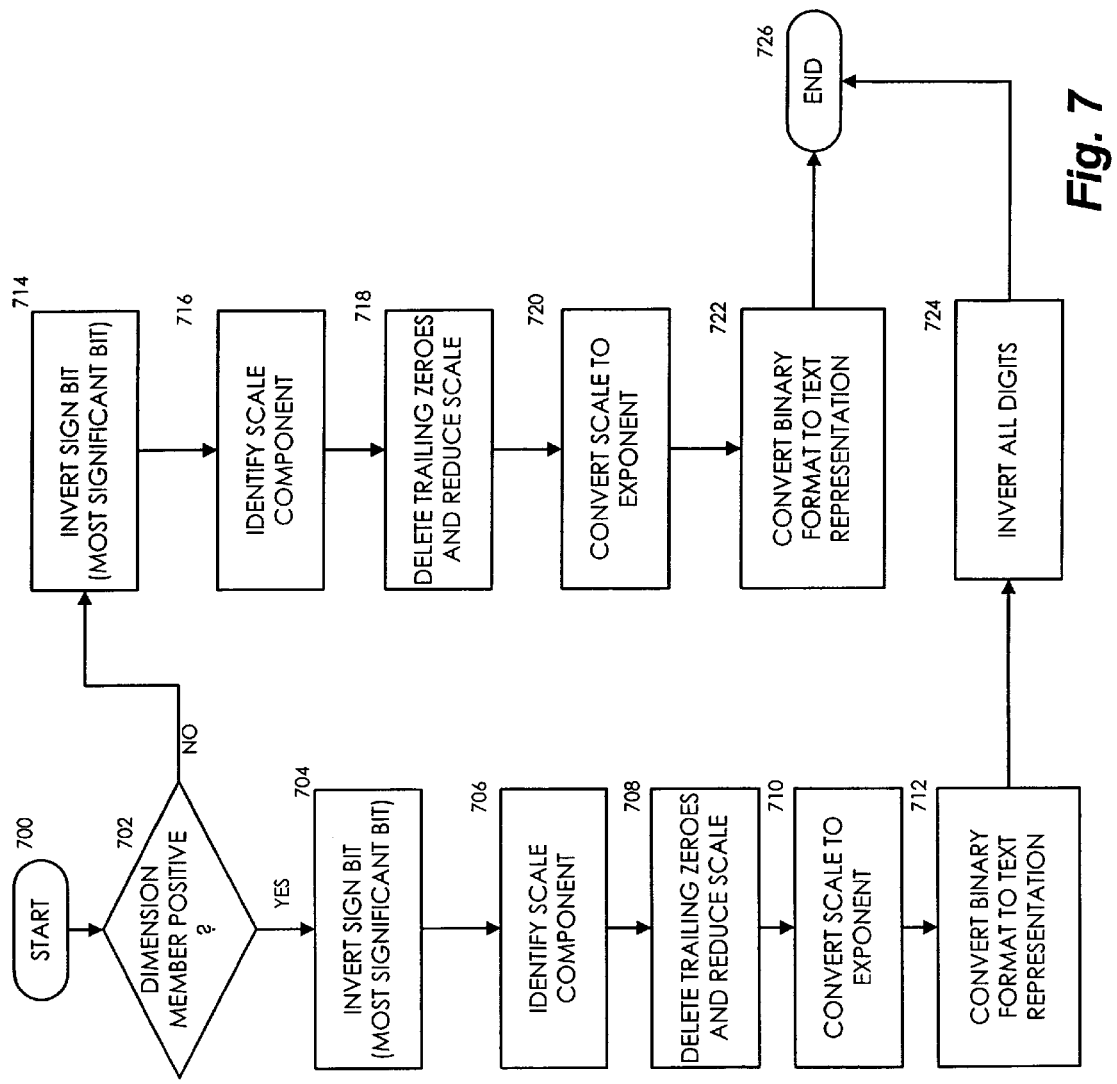
FIG. 7 is flow chart depicting an exemplary method for converting a non-text decimal dimension member to textual representation.

FIG. 7 is flow chart depicting an exemplary method for converting a non-text decimal dimension member to a textual representation. The method of FIG. 7 starts at step 700 and proceeds to decision block 702. At decision block 702, a determination is made as to whether the decimal number is a positive number. If the decimal number is a positive number then the method branches to step 704. At step 704, the most significant bit or the signed bit is inverted. The method then proceeds to step 706.

At step 706, the scale component of the dimension member is identified and the method proceeds to step 708. At step 708, any trailing zeroes (zeroes on the right-most portion of the significant) are deleted from the significant and the scale is reduced accordingly. For example, if a decimal number's significant component includes four trailing zeroes, then the zeroes will be deleted and the scale will be reduced by four.

The method then proceeds to step 710 and the scale component is converted to an exponent. If the dimension member's sign is negative, then the exponent is negated and offset, to avoid the use of negative exponent values. For example, an exponent of −3 where the range of possible exponents is from −28 to +28 will have 28 added to it resulting in an exponent value of 25. However, if the dimension member is negative, then the exponent (−3) is first negated (+3) then offset giving a value of 31. Those skilled in the art will appreciate that various methods for converting a scale to an exponent may be used to implement an embodiment of the present invention. However, the conversion method used should result in a negative dimension member with a larger exponent (e.g., 1E-10) sorting before (in ascending order) a negative dimension member with a smaller exponent (e.g., 1E-9).

The method then proceeds to step 712 and the binary representation (i.e., the signed bit, the exponent, and the significant) of the decimal number is converted to a textual representation. The sign and computed exponent field (not an actual exponent at this point) have their binary representations converted to hexadecimal and stored. The significant is converted to decimal digits and stored.

After the decimal number has been placed in a textual representation, the method proceeds to step 724 and all digits of the decimal (text) representation of the significant are inverted. That is, all digits are subtracted from nine. The method then proceeds to step 726 and ends.

Returning now to decision block 702, if a determination is made that the decimal number is a negative number, then the method branches to step 714. At step 714, the most significant bit or sign bit is inverted (a "1" changed to a "0" or a "0" changed to a "1"). The method then proceeds to step 716. At step 716, the scale component of the dimension member is identified and the method proceeds to step 718. At step 718, any trailing zeroes are deleted and the scale component is reduced as described above. The method then proceeds to step 720 and the scale is converted to an exponent, as described above. The method then proceeds to 722 and the binary representation (i.e., the signed bit, the exponent, and the significant) of the decimal number is converted to a textual representation. The method then proceeds to step 726 and ends.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for populating a database file with text strings representing database values, the method comprising:

receiving a first dimension member;

determining whether the database values comprise a plurality of data class types, wherein the plurality of data class types comprise at least two of: numeric, date, string, Boolean, and null data class types;

in response to determining that the database values comprise a plurality of data class types, assigning a code associated with a class type to the first dimension member;

determining, by a computing device comprising a processing unit coupled to a memory storage, whether the first dimension member is a numeric database value;

in response to determining that the first dimension member is the numeric database value, determining a numeric data type of the numeric database value;

converting the first dimension member to a text string;

storing the converted dimension member in the database file in response to a determination that the first dimension member is a numeric database value, wherein the step of converting the first dimension member to a text string comprises appending a sub-code associated with the numeric data type to the numeric database value to enable the numeric database value to be sorted by the numeric data type, wherein the sub-code comprises one of a plurality of sub-codes associated with the code assigned to the first dimension member;

converting the numeric database value to a second text string if the precision of the numeric database value is greater than can be stored in a double precision floating point number;

appending the second text string to the textual representation of the numeric database value if the precision of the numeric data is greater than can be stored in a double precision floating point number;

storing the first dimension member in the database file, in response to a determination that the first dimension member is not a numeric database value;

sorting the converted dimension member within the database file according to the code assigned to the first dimension member; and sorting the first dimension member with at least one second dimension member assigned the same code independently of the sub-code appended to the converted dimension member.

2. The method of claim 1, wherein the numeric database value is an integer type.

3. The method of claim 1, wherein the numeric database value is a floating point type.

4. The method of claim 1, wherein the numeric database value is a decimal type.

5. The method of claim 1, wherein the numeric database value is a date type.

6. The method of claim 1, wherein the numeric database value is a Boolean type.

7. The method of claim 1, wherein the numeric database value is a null type.

8. A computer implemented method for classifying a textual representation of a numeric database value within a database file, the method comprising:

determining whether a plurality of database values comprise a plurality of class types, wherein the plurality of class types comprise at least two of: numeric, date, string, Boolean, and null data class types;

in response to determining whether the database values comprise a plurality of data class types, assigning a code to the textual representation of the numeric database value, wherein the code identifies the class type of the textual representation;

appending the code to the textual representation of the numeric database value;

determining a numeric data type of the numeric database value;

assigning a sub-code to the textual representation of the numeric database value, wherein the sub-code identifies the sub-class numeric data type of the textual representation of the numeric database value and wherein the sub-code comprises one of a plurality of sub-codes associated with the code assigned to the textual representation;

appending the sub-code to the textual representation of the numeric database value, wherein appending the sub-code to the textual representation of the numeric database value comprises enabling the numeric database values to be sorted by the class type of the textual representation of the numeric database value;

converting the numeric database value to a text string if the precision of the numeric database value is greater than can be stored in a double precision floating point number;

appending the text string to the textual representation of the numeric database value if the precision of the numeric data is greater than can be stored in a double precision floating point number;

sorting the textual representation within the database file according to the code assigned to the first dimension member; and sorting the textual representation against at least one other textual representation assigned the same code independently of the sub-code appended to the converted dimension member.

9. The method of claim 8, wherein the sub-class type is selected from the group of:

integer, floating point, and decimal.

10. A computer readable medium having stored thereon computer-executable instructions for performing a method for populating a database file with text strings representing numeric database values, the method comprising:

receiving a first dimension member;

determining whether the database values comprise a plurality of data class types, wherein the plurality of data class types comprise at least two of: numeric, date, string, Boolean, and null data class types;

in response to determining whether the database values comprise a plurality of data class types, assigning a code associated with a class type to the first dimension member;

determining whether the first dimension member is a numeric database value;

in response to determining that the first dimension member is the numeric database value, determining a numeric data type of the numeric database value;

converting the first dimension member to a text string;

storing the converted dimension member in the database file in response to a determination that the first dimension member is a numeric database value, wherein the step of converting the first dimension member to a text string comprises appending a sub-code associated with the numeric data type to the numeric database value to enable the numeric database value to be sorted by the numeric data type and wherein the sub-code comprises one of a plurality of sub-codes associated with the code assigned to the first dimension member;

converting the numeric database value to a second text string if the precision of the numeric database value is greater than can be stored in a double precision floating point number;

appending the second text string to the textual representation of the numeric database value if the precision of the numeric data is greater than can be stored in a double precision floating point number;

storing the first dimension member in the database file, in response to a determination that the first dimension member is not a numeric database value; and sorting the converted dimension member within the database file according to the code assigned to the first dimension member; and sorting the first dimension member with at least one second dimension member assigned the same code independently of the sub-code appended to the converted dimension member.

11. The computer readable medium of claim 10, wherein the numeric database value is an integer type.

12. The computer readable medium of claim 10, wherein the numeric database value is a floating point type.

13. The computer readable medium of claim 10, wherein the numeric database value is a decimal type.

14. The computer readable medium of claim 10, wherein the numeric database value is a date type.

15. The computer readable medium of claim 10, wherein the numeric database value is a Boolean type.

16. The computer readable medium of claim 10, wherein the numeric database value is a null type.

17. A computer implemented method for converting a numeric database value in a binary representation, having a plurality of bits, to a text string while preserving numeric precision and sort order, wherein the numeric database value comprises at least one of an integer type, floating point type, and decimal type numeric database value, the method comprising:

determining whether the numeric database value comprises at least one of a plurality of data class types, wherein the plurality of data class types comprise at least two of: numeric, date, string, Boolean, and null data class types;

in response to determining that the numeric database value comprises at least one of the plurality of data class types, assigning a code associated with the data class type to the numeric database value;

determining, by a computing device comprising a processing unit coupled to a memory storage, a numeric data type of the numeric database value, wherein the numeric data type comprises a sub-type of the assigned data class type;

assigning a sub-code to the text string of the numeric database value, wherein the sub-code identifies the numeric data type of the text string of the numeric database value and wherein the sub-code comprises one of a plurality of sub-codes associated with the code associated with the assigned data class type;

in response to a determination that the numeric database value is an integer type, performing the steps of:
  inverting an integer sign bit, and
  converting the integer type numeric database value from the binary representation to a hexadecimal representation;

in response to a determination that the numeric database value is a floating point type, performing the steps of:
  determining whether the floating point type numeric database value is positive;
  in response to a determination that the floating point type numeric database value is positive, performing the steps of:
    inverting a sign bit, and
    converting the floating point type numeric database value from the binary representation to a hexadecimal representation;
  in response to a determination that the floating point type numeric database value is not positive, performing the steps of:
    inverting each of the plurality of bits, and
    converting the floating point type numeric database value from the binary representation to the hexadecimal representation;

in response to a determination that the numeric database value is a decimal type numeric database value, performing the steps of:
  determining whether the decimal type numeric database value is positive,
  in response to a determination that the decimal type numeric database value is positive, performing the steps of:
    inverting the integer sign bit,
    converting the decimal type numeric database value from the binary representation to a decimal representation having a plurality of digits, and
    inverting each of the plurality of digits,
  in response to a determination that the decimal type numeric database value is not positive, performing the steps of:
    inverting the sign bit, and
    converting the decimal type numeric database value from the binary representation to a decimal representation having a plurality of digits; and storing the converted database value in a database file;

sorting the converted database value within the database file according to the code assigned to the numeric database value; and sorting the converted database value with at least one second converted database value assigned the same code independently of the sub-code appended to the converted dimension member.

18. A method for populating a database file with text strings representing numeric data, the method comprising:

receiving a first dimension member out of a plurality of dimension members;

determining whether the plurality of dimension members comprise a plurality of data class types, wherein the plurality of data class types comprise at least two of: numeric, date, string, Boolean, and null data class types;

in response to determining that the plurality of dimension members comprise a plurality of data class types, determining a data class type of the first dimension member and assigning a code associated with the data class type to the first dimension member;

determining, by a computing device comprising a processing unit coupled to a memory storage, whether the first dimension member is numeric data;

in response to determining that a first dimension member is numeric data, determining a numeric data type of the numeric data;

converting the first dimension member to a double precision floating point number;

converting the resultant double precision floating point number to a text string and storing the resultant text string in the database file, in response to a determination that the first dimension member is numeric data, wherein in converting the first dimension to a text string, the numeric precision and sort order of the first dimension member in the plurality of dimension members is maintained;

assigning a sub-code to the text string, wherein the sub-code identifies the numeric data type of the text string of the numeric data and wherein the sub-code comprises one of a plurality of sub-codes associated with the code assigned to the first dimension member;

converting the numeric database value to a second text string if the precision of the numeric database value is greater than can be stored in the double precision floating point number; and appending the second text string to the first text string if the precision of the numeric data is greater than can be stored in the double precision floating point number; and storing the first dimension member in the database file, in response to a determination that the first dimension member is not numeric data; and storing the first dimension member in the database file, in response to a determination that the first dimension member is not a numeric database value;

sorting the first dimension member within the database file according to the code assigned to the first dimension member; and sorting the first dimension member against at least one second dimension member assigned the same code independently of the sub-code appended to the converted dimension member.

* * * * *